(12) United States Patent
Tanaka

(10) Patent No.: US 9,101,825 B2
(45) Date of Patent: Aug. 11, 2015

(54) GAME SYSTEM, GAME APPARATUS, NON-TRANSITORY COMPUTER-READABLE STORAGE MEDIUM HAVING GAME PROGRAM STORED THEREON, AND GAME PROCESSING METHOD

(71) Applicant: NINTENDO CO., LTD., Kyoto (JP)

(72) Inventor: Katsutomo Tanaka, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 197 days.

(21) Appl. No.: 13/920,672

(22) Filed: Jun. 18, 2013

(65) Prior Publication Data

US 2014/0295940 A1 Oct. 2, 2014

(30) Foreign Application Priority Data

Mar. 26, 2013 (JP) ................. 2013-064307

(51) Int. Cl.
| | |
|---|---|
| A63F 9/24 | (2006.01) |
| A63F 13/00 | (2014.01) |
| A63F 13/21 | (2014.01) |
| A63F 13/493 | (2014.01) |
| A63F 13/49 | (2014.01) |
| A63F 13/843 | (2014.01) |
| A63F 13/45 | (2014.01) |

(52) U.S. Cl.
CPC ............... *A63F 13/00* (2013.01); *A63F 13/21* (2014.09); *A63F 13/45* (2014.09); *A63F 13/49* (2014.09); *A63F 13/493* (2014.09); *A63F 13/843* (2014.09)

(58) Field of Classification Search
CPC .......... A63F 13/10; A63F 13/20; A63F 13/21; A63F 13/45; A63F 13/49; A63F 13/493; A63F 13/843
See application file for complete search history.

(56) References Cited

PUBLICATIONS

"Wikipedia Rock Band 3". From Wikipedia, The Free Encylopedia. [online], retrieved on Feb. 23, 2015. Retrieved from the Internet <URL:http://en.wikipedia.org/wiki/Rock_Band_3>. 14 pages.*
"Rock Band 3 Review", [dated Oct. 28, 2010]. From eurogamer.net. [online], [retrieved Feb. 23, 2015] Retrieved from the Internet <URL:http://www.eurogamer.net/articles/2010-10-28-rock-band-3-review>. 6 pages.*
Nintendo Puzzle Collection, Dr. Mario + Yoshi's Cookie + Panel de Pon, http://www.nintendo.co.jp/ngc/gpzj/index/html including partial translation.

* cited by examiner

Primary Examiner — Lawrence Galka
(74) Attorney, Agent, or Firm — Nixon & Vanderhye, P.C.

(57) ABSTRACT

A game system in which a plurality of players can play a game by using a plurality of operation devices is provided. A multiplayer game process is performed by using a plurality of first-type operation devices. During progress of the game, a process is caused in which any player is caused to operate a second-type operation device different from the first-type operation devices. If the player has satisfied a predetermined condition during this process, the player is caused to return to the operation using the first-type operation device.

18 Claims, 14 Drawing Sheets

CARD

F I G. 1 7
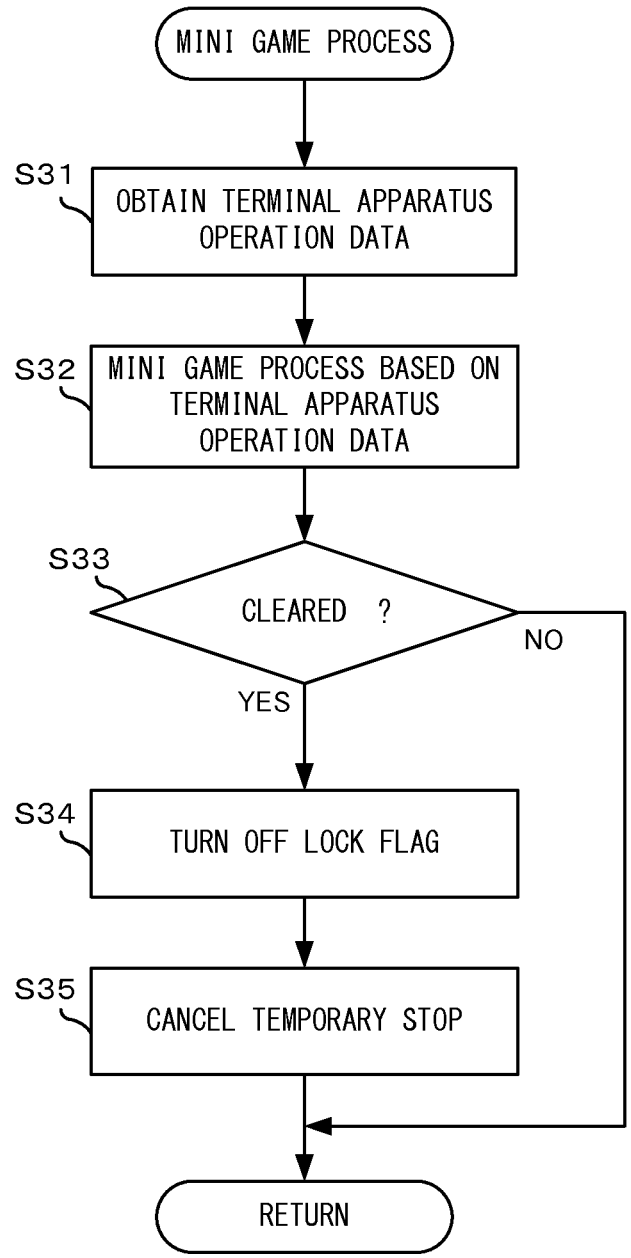

GAME SYSTEM, GAME APPARATUS, NON-TRANSITORY COMPUTER-READABLE STORAGE MEDIUM HAVING GAME PROGRAM STORED THEREON, AND GAME PROCESSING METHOD

CROSS REFERENCE TO RELATED APPLICATION

The disclosure of Japanese Patent Application No. 2013-64307, filed on Mar. 26, 2013, is incorporated herein by reference.

FIELD

The exemplary embodiments relate to a game system, a game apparatus, a non-transitory computer-readable storage medium having a game program stored thereon, and a game processing method, which enable a game process for a multiplayer game using a plurality of operation devices.

BACKGROUND AND SUMMARY

Conventionally, a puzzle game which enables competitive play between players has been known. For example, there has been a puzzle game having immediacy, in which players can compete to align puzzle blocks falling from above and make them disappear.

In the above game, during the competitive play, each player continuously operates the same controller.

Therefore, it is a feature of the exemplary embodiments to provide a game system which enables a new way to play a game, in which each player is caused to operate another controller during competitive play.

In order to attain the feature described above, for example, the following configuration examples are exemplified.

A configuration example is a game system capable of performing a game process of a multiplayer game by using a plurality of operation devices, and the game system includes: a plurality of first-type operation devices; a second-type operation device different from the first-type operation devices; a main game processing section; a second operation device utilization processing section; and a restoration processing section. The main game processing section performs the multiplayer game process that is progressed based on operations by the plurality of first-type operation device. The second operation device utilization processing section causes any player to stop the operation with the first type-operation device while the main game processing section is conducting the game in accordance with the operations by the plurality of first-type operation devices, and performs a predetermined process that needs an operation with the second-type operation device. The restoration processing section causes the player who has stopped the operation to return to the operation with the first-type operation device, when a predetermined condition is satisfied in the predetermined process that needs the operation with the second type operation device.

According to the above configuration example, while a plurality of players play the game using the first-type operation devices, any player is caused to operate the second-type operation device different from the first-type operation devices. Thus, a new way to play the game can be provided.

In another configuration example, the second operation device utilization processing section causes the main game processing section not to accept the operation from the first-type operation device operated by the any player, while the main game processing section is conducting the game, and performs a process of causing the player to perform a sub game that is progressed based on the operation with the second-type operation device. When a predetermined condition is satisfied in the process of the sub game, the restoration processing section performs a process of restoring the main game processing section to the state where it can accept the operation from the first-type operation device of the player who has been caused to play the sub game. Further, the second operation device utilization processing section may perform the predetermined process that needs the operation with the second-type operation device, when a predetermined condition in the main game is satisfied during the progress of the game by the main game processing section.

According to the above configuration example, while a plurality of players play the game, any player is caused to be incapable of performing the operation to hinder the game progress of the player, and then the player is caused to operate the second-type operation device to cancel such a situation. Thus, a new way to play the game can be provided.

In another configuration example, the second-type operation device may include a display section, and an operation section that is not included in the first-type operation devices, and the second operation device utilization processing section may display an image relating to the predetermined process on the display section of the second-type operation device, and perform the predetermined process based on an operation content of the operation section that is not included in the first-type operation devices. Further, the operation section of the second-type operation device, which is not included in the first-type operation devices, may be a touch panel.

According to the above configuration example, the second-type operation device can be operated using the operation section that is not included in the first-type operation devices. For example, when the operation section is a touch panel, it is possible to cause the player to perform an intuitive and simple operation. Thereby, for example, in a competitive game having immediacy, the difficulty of the operation to the second-type operation device can be reduced while a sense of tension is increased due to the incapability of operating the first-type operation device. Thus, the difficulty of the game to return to the competitive game play can be made moderate to enhance the fun of the game.

In another configuration example, the main game processing section may perform a competitive game process as the multiplayer game process, and the second operation device utilization processing section may perform the predetermined process that needs the operation with the second-type operation device, as a process of stopping the progress of the main game process of a player as an opponent.

Further, the main game processing section may perform a puzzle game as the competitive game.

Furthermore, the second operation device utilization processing section may perform a sub game process that is progressed based on the operation with the second-type operation device, as the predetermined process that needs the operation with the second-type operation device, and the restoration processing section may perform a process of causing the player who has stopped the operation to return to the operation with the first-type operation device, when a clear condition that has been defined in advance as a sub game clear condition is satisfied by the operation with the second-type operation device.

Moreover, the sub game may be a game that causes a player to perform a predetermined input operation continuously a predetermined number of times or more. When the predetermined input operation has been continuously performed the predetermined number of times or more, the restoration processing section may determine that the clear condition is satisfied, and perform the process of causing the player who has stopped the operation to return to the operation with the first-type operation device. Further, the sub game may be a game in which a player is caused to find a predetermined object hidden in a screen. The restoration processing section may determine whether or not the predetermined object is found by the player in the sub game. Upon determining that the predetermined object is found, the restoration processing section may determine that the clear condition is satisfied, and perform the process of causing the player who has stopped the operation to return to the operation with the first-type operation device.

According to the configuration example, for example, the fun of a competitive puzzle game can be enhanced.

According to the exemplary embodiment, it is possible to provide a new way to play a game in which a player is caused to exchange a controller for another controller while playing a competitive game, and thus the fun of the competitive game can be enhanced.

BRIEF DESCRIPTION OF THE DRAWINGS

FIG. 17 is a flowchart showing in detail a mini game process in step 10 shown in FIG. 15.

DETAILED DESCRIPTION OF NON-LIMITING EXAMPLE EMBODIMENTS

Figure 1:
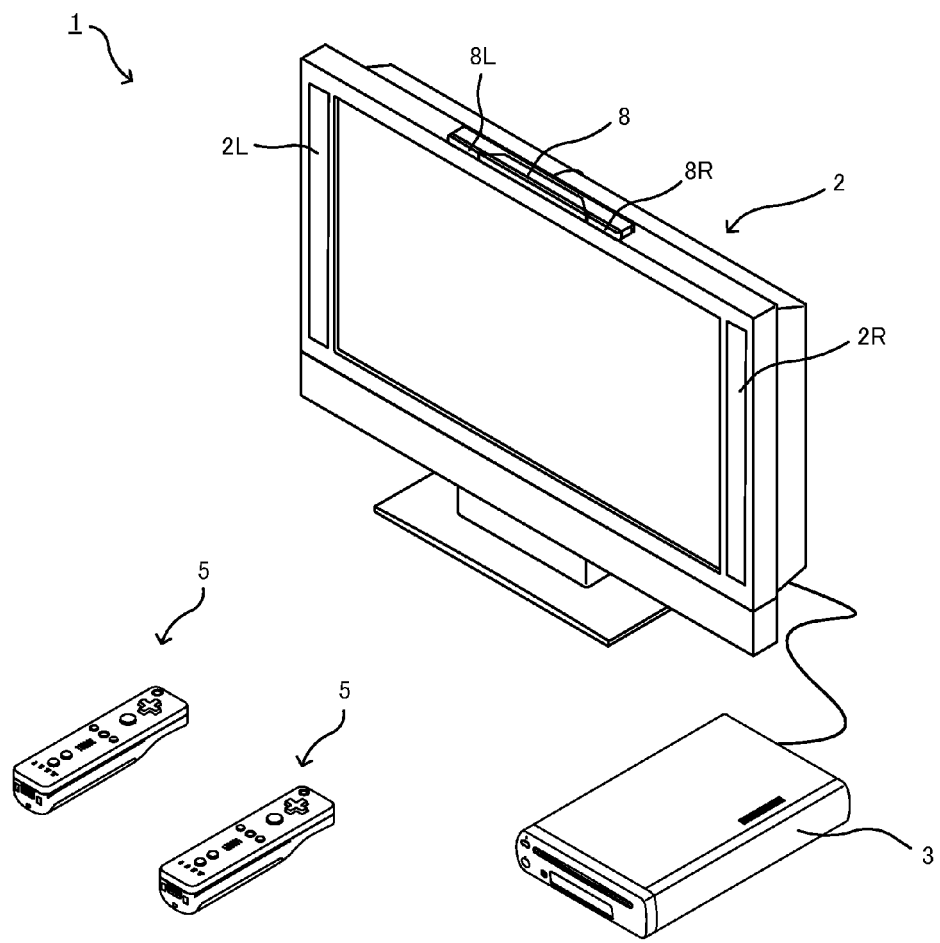
FIG. 1 is a diagram showing a non-limiting example of an external configuration of a game system 1 according to an exemplary embodiment.
Figure 1:
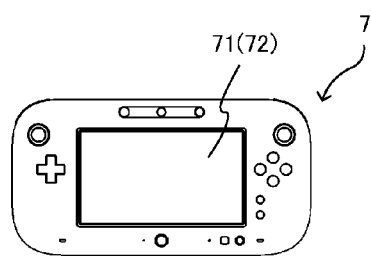

Hereinafter, a game system 1 according to an exemplary embodiment will be described with reference to the drawings. FIG. 1 is an external view of the game system 1. In FIG. 1, the game system 1 includes: a stationary display device (hereinafter, referred to as "television") 2 typified by, for example, a television receiver; a stationary game apparatus 3; controllers 5; a terminal apparatus 7; and a marker device 8. The game system 1 performs game processing in the game apparatus 3 on the basis of a game operation with each controller 5, and displays a game image obtained by the game processing, on the television 2 and/or the terminal apparatus 7.

An optical disc (not shown) which is an example of an information storage medium exchangeably used to the game apparatus 3, is detachably inserted into the game apparatus 3.

The television 2 is connected to the game apparatus 3 via a connection cord. The television 2 displays the game image obtained by the game processing performed in the game apparatus 3. It is noted that in another embodiment, the game apparatus 3 and the stationary display device may be integrated with each other. In addition, communication between the game apparatus 3 and the television 2 may be wireless communication.

In the periphery of the screen of the television 2 (above the screen in FIG. 1), the marker device 8 is installed. Although described in detail later, a user (player) can perform a game operation of moving the controller 5. The marker device 8 is used by the game apparatus 3 to calculate the motion, position, attitude and the like of the controller 5. The marker device 8 includes two markers 8R and 8L at its two ends. Specifically, the marker 8R (the same applies to the marker 8L) is composed of one or more infrared LEDs (Light Emitting Diodes), and outputs infrared light forward from the television 2. The marker device 8 is connected to the game apparatus 3, and the game apparatus 3 can control each of the infrared LEDs included in the marker device 8 to be lit on or off.

Each controller 5 provides the game apparatus 3 with operation data representing the content of an operation performed on the controller 5 itself. Each controller 5 and the game apparatus 3 are able to communicate with each other by means of wireless communication. In the exemplary embodiment, each controller 5 and the game apparatus 3 wirelessly communicate with each other using, for example, the Bluetooth (registered trademark) technology. It is noted that in another embodiment each controller 5 and the game apparatus 3 may be connected to each other in a wired manner. The game apparatus 3 is able to communicate with a plurality of controllers, and a plurality of players are allowed to play a game by simultaneously using a predetermined number of controllers. In the exemplary embodiment, it is assumed that the number of the controllers 5 included in the game system 1 is two so that two players are allowed to play a game simultaneously. The detailed configuration of each controller 5 will be described later.

The terminal apparatus 7 has a size small enough to be held by the user, and the user is allowed to move the terminal apparatus 7 with hands or place the terminal apparatus 7 at any location when using the terminal apparatus 7. Although the detailed configuration of the terminal apparatus 7 will be described later, the terminal apparatus 7 includes an LCD (Liquid Crystal Display) 71 as display means, and input means (such as a touch panel 72 described later). The terminal apparatus 7 and the game apparatus 3 are able to communicate with each other wirelessly (or via wired means). The terminal apparatus 7 receives, from the game apparatus 3, data of an image (e.g., a game image) generated in the game apparatus 3, and displays the image on the LCD 71. In addition, the terminal apparatus 7 transmits, to the game apparatus 3, operation data representing the content of an operation performed on the terminal apparatus 7.

Figure 2:
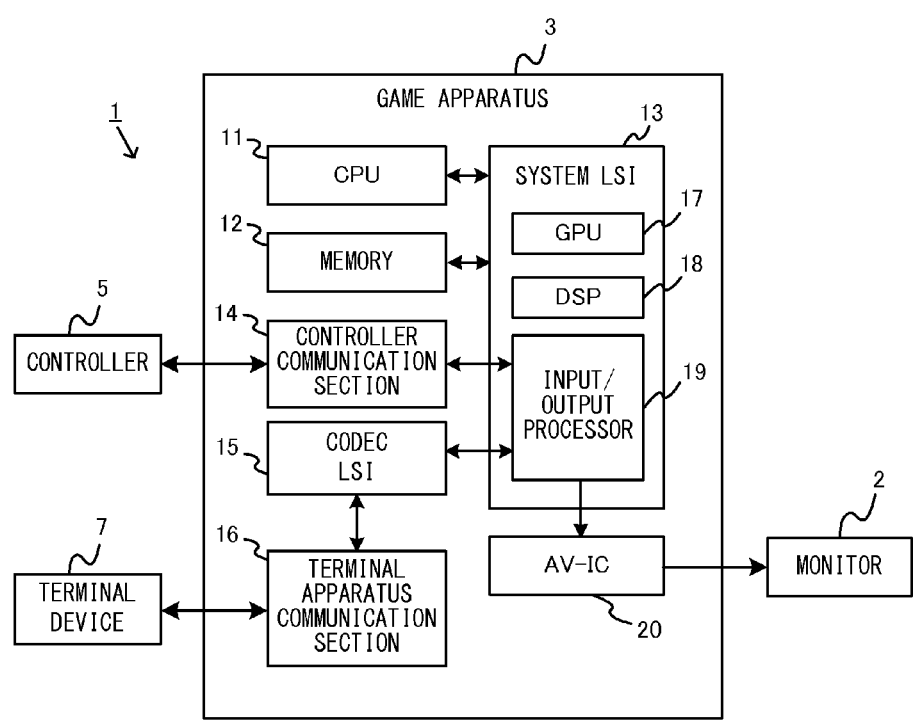
FIG. 2 is a block diagram showing a non-limiting example of a configuration of a game apparatus 3.

FIG. 2 is a block diagram of the game apparatus 3 that is an example of an information processing apparatus. In FIG. 2, the game apparatus 3 includes a CPU (control section) 11, a memory 12, a system LSI 13, a controller communication section 14, a codec LSI 15, a terminal apparatus communication section 16, an AV-IC (Audio Video-Integrated Circuit) 20, and the like.

The CPU 11 performs a predetermined information processing program (the game program in the exemplary embodiment) by using the memory 12, the system LSI 13, and the like. By so doing, various functions (e.g., the game processing) in the game apparatus 3 are realized. The CPU 11 is connected to the system LSI 13.

The system LSI 13 includes a PGU (Graphics Processor Unit) 17, a DSP (Digital Signal Processor) 18, an input-output processor 19, and the like. The GPU 17 generates an image in accordance with a graphics command (image generation command) from the CPU 11. It is noted that in the present embodiment, the game apparatus 3 generates both a game image to be displayed on the television 2 and a game image to be displayed on the terminal apparatus 7. Hereinafter, the game image to be displayed on the monitor 2 may be referred to as "television game image", and the game image to be displayed on the terminal apparatus 7 may be referred to as "terminal game image".

The DSP 18 functions as an audio processor and generates audio data using sound data and acoustic waveform (tone quality) data that are stored in the memory 12.

The input-output processor 19 transmits/receives data to/from components connected thereto, and downloads data from an external apparatus. The input-output processor 19 is connected to the controller communication section 14, the codec LSI 15, and the AV-IC 20. An antenna (not shown) is connected to the controller communication section 14. The codec LSI 15 is connected to the terminal apparatus communication section 16, and an antenna (not shown) is connected to the terminal apparatus communication section 16. The input-output processor 19 transmits/receives data to/from each controller 5 via the controller communication section 14. For example, the input-output processor 19 receives operation data transmitted from each controller 5 and stores (temporarily stores) the operation data into a buffer area of the memory 12.

Data of an image and a sound to be outputted in the television 2, among images and sounds generated in the game apparatus 3, is read by the AV-IC 20. The AV-IC 20 outputs the read image data to the television 2 via an AV connector (not shown), and outputs the read audio data via the AV connector to the speakers 2L and 2R included in the television 2. By so doing, the image is displayed on the television 2, and the sound is outputted from the speakers 2L and 2R.

The game apparatus 3 is able to transmit/receive data of images, sounds, and the like to/from the terminal apparatus 7. When transmitting a game image (terminal game image) to the terminal apparatus 7, the input-output processor 19 outputs data of a game image generated by the GPU 17, to the codec LSI 15. The codec LSI 15 performs a predetermined compression process on the image data outputted from the input-output processor 19. The terminal apparatus communication section 16 performs wireless communication with the terminal apparatus 7. Accordingly, the image data compressed by the codec LSI 15 is transmitted by the terminal apparatus communication section 16 to the terminal apparatus 7. In addition to the image data, the game apparatus 3 transmits audio data to the terminal apparatus 7. Specifically, the input-output processor 19 outputs audio data generated by the DSP 18, to the terminal apparatus communication section 16 via the codec LSI 15. Similarly to the image data, the codec LSI 15 also performs a compression process on the audio data. The terminal apparatus communication section 16 transmits the compressed image data and the compressed audio data to the terminal apparatus 7.

In addition, the game apparatus 3 transmits, as well as the image data and the audio data described above, various control data to the terminal apparatus 7 where necessary. The control data is data representing a control instruction to be given to a component included in the terminal apparatus 7. The control data represents, for example, an instruction to control a marker section (marker sections 78L and 78R shown in FIG. 5 described later). The input/output processor 19 transmits the control data to the terminal apparatus 7 in accordance with an instruction from the CPU 11.

In addition, the game apparatus 3 is able to receive various data from the terminal apparatus 7. For example, the terminal apparatus 7 transmits operation data. The input-output processor 19 stores (temporarily stores) the data received from the terminal apparatus 7, into the buffer area of the memory 12.

Figure 3:
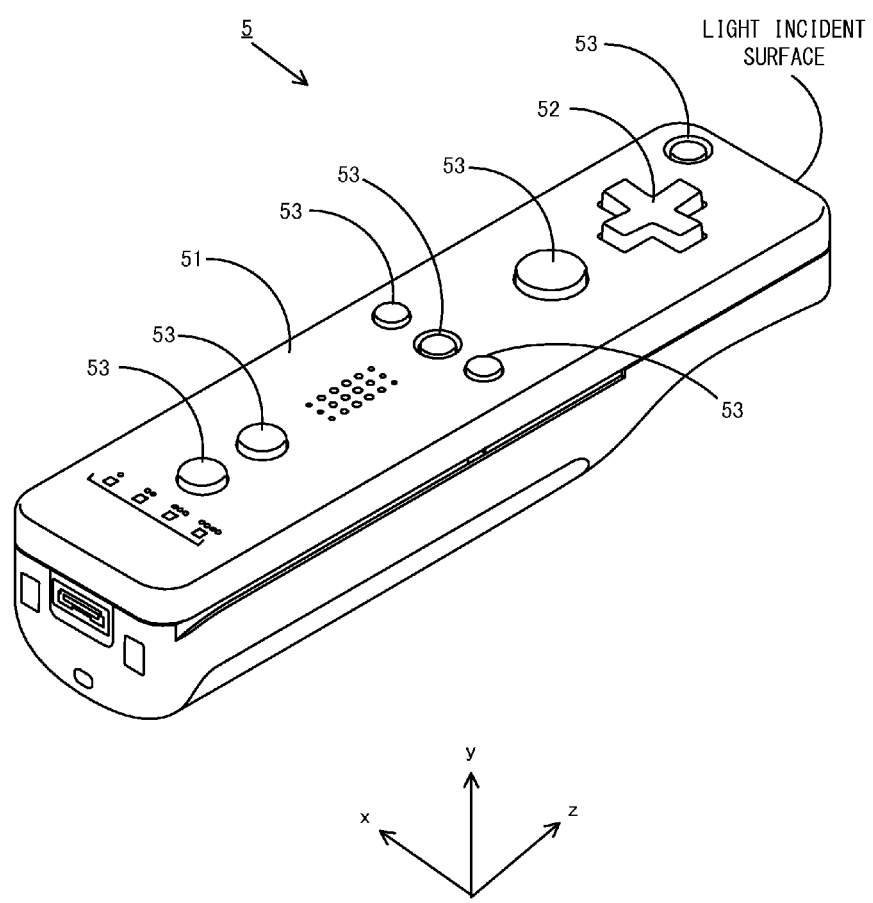
FIG. 3 is a perspective view showing a non-limiting example of an external configuration of a controller 5.

Next, the controller 5 will be described. FIG. 3 is a perspective view showing the external configuration of each controller 5. In FIG. 3, the controller 5 includes a housing 51 that is formed by, for example, plastic molding. In addition, the controller 5 includes a cross key 52, a plurality of operation buttons 53, and the like as an operation section (an operation section 61 shown in FIG. 4). The controller 5 further includes a motion sensor. The player is allowed to perform a game operation by pressing each button provided in the controller 5, and by moving the controller 5 itself to change its position and attitude.

Figure 4:
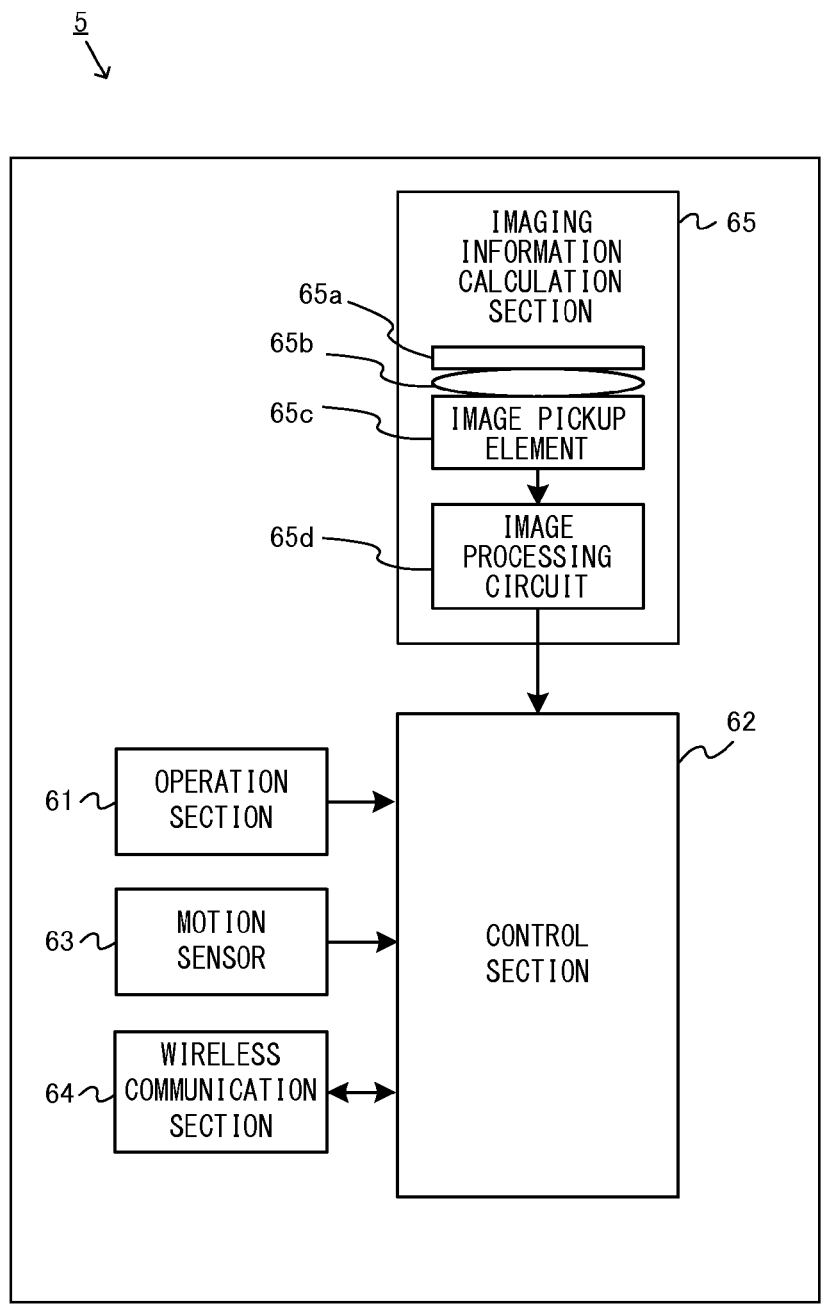
FIG. 4 is a schematic diagram showing a non-limiting example of a flow to start of a communication game according to the exemplary embodiment.

Further, the controller 5 includes an imaging information calculation section 65 (FIG. 4). A light incident surface of the imaging information calculation section 65 is provided on the front surface of the housing 51. The light incident surface is formed of a material that allows at least infrared light from the markers 8R and 8L to pass therethrough.

FIG. 4 is a block diagram showing the configuration of each controller 5. The controller 5 includes the operation section 61 (the operation buttons 52 to 53), a control section 62, a motion sensor 63, a wireless communication section 64, and the imaging information calculation section 65. The controller 5 transmits data representing the content of an operation performed on the controller 5, as operation data to the game apparatus 3. In the following description, the operation data transmitted by the controller 5 is sometimes referred to as "controller operation data", and the operation data transmitted by the terminal apparatus 7 is sometimes referred to as "terminal operation data".

The control section 62 controls an operation in the controller 5. Specifically, the control section 62 receives the data outputted from the respective input sections (the operation section 61, the motion sensor 63, and the imaging information calculation section 65), and transmits the data as operation data to the game apparatus 3 via the wireless communication section 64.

The motion sensor 63 is a sensor for detecting the attitude of the controller 5. The motion sensor 63 is, for example, an acceleration sensor or an angular velocity sensor.

Further, the controller 5 includes the wireless communication section 64 which can wirelessly communicate with the game apparatus 3. In the exemplary embodiment, the controller 5 and the game apparatus 3 wirelessly communicate with each other. However, in another embodiment, the controller 5 and the game apparatus 3 may communicate with each other via wired means.

Further, the controller 5 includes the imaging information calculation section 65. The imaging information calculation section 65 is a system for analyzing image data taken by imaging means and calculating the position of the center of gravity, the size, and the like of an area having a high brightness in the image data.

The imaging information calculation section 65 includes an infrared filter 65a, a lens 65b, an image pickup element 65c, and an image processing circuit 65d. The infrared filter 65a allows, among light incident on the front surface of the controller 5, only infrared light to pass therethrough. The lens 65b collects the infrared light having passed through the infrared filter 65a, and emits the infrared light to the image pickup element 65c. The image pickup element 65c is a solid-state image pickup device such as a CMOS sensor or a CCD sensor. The image pickup element 65c receives the infrared light collected by the lens 65b, and outputs an image signal. Here, the capturing targets, i.e., the marker device 8 and a marker section 78 of the terminal apparatus 7 described later, each include markers that output infrared light. Therefore, the provision of the infrared filter 65a allows the image pickup element 65c to receive only the infrared light having passed through the infrared filter 65a, and generate image data. This makes it possible to accurately capture the capturing targets (the marker section 78 and/or the marker device 8). Hereinafter, an image captured by the image pickup element 65c is referred to as a "captured image". The image data generated by the image pickup element 65c is processed by the image processing circuit 65d. The image processing circuit 65d calculates the positions of the capturing targets in the captured image. The image processing circuit 65d outputs coordinates representing the calculated positions to the control section 62. Data of the coordinates is transmitted from the control section 62 to the game apparatus 3 as operation data. Hereinafter, the coordinates described above are referred to as "marker coordinates". The marker coordinates change in accordance with the direction (the angle of tilt) and the position of the controller 5, and therefore, the game apparatus 3 can calculate the direction and the position of the controller 5 by using the marker coordinates.

The controller 5 also includes a loudspeaker (not shown) as sound output means.

Figure 5:
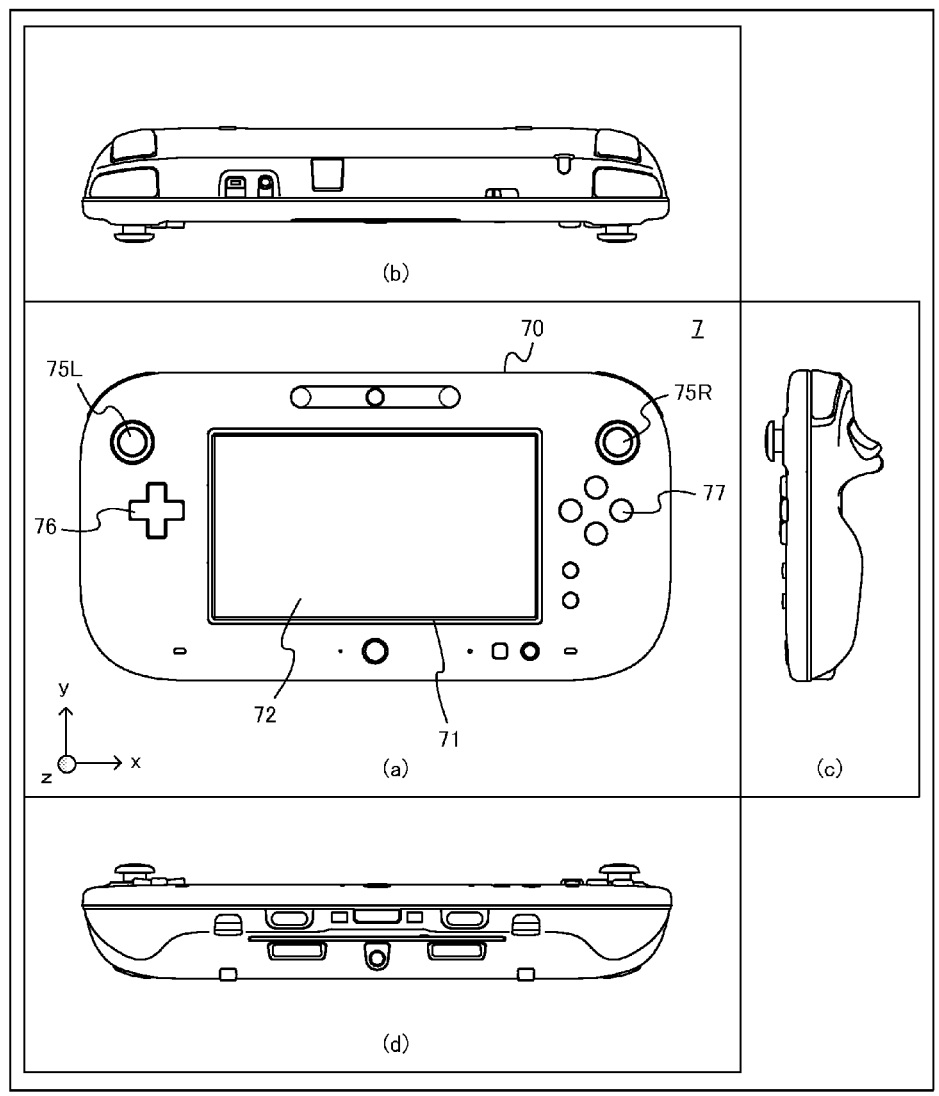
FIG. 5 is a diagram showing a non-limiting example of an external configuration of a terminal apparatus 7.

Next, the configuration of the terminal apparatus 7 will be described with reference to FIG. 5. FIG. 5 is a diagram showing the external configuration of the terminal apparatus 7. In FIG. 5, (a) is a front view of the terminal apparatus 7; (b) is a top view of the terminal apparatus 7; (c) is a right side view of the terminal apparatus 7; and (d) is a bottom view of the terminal apparatus 7.

The terminal apparatus 7 includes the LCD 71 on a front surface of the housing 70. The LCD 71 is provided near the center of the front surface of the housing 70. In addition, the terminal apparatus 7 includes, as one of operations means, a touch panel 72 on the screen of the LCD 71. In the exemplary embodiment, the touch panel 72 is, but is not limited to, a resistive film type touch panel. However, a touch panel of any type, such as electrostatic capacitance type, may be used. The touch panel 72 may be of single touch type or multiple touch type. In the exemplary embodiment, the touch panel 72 has the same resolution (detection accuracy) as that of the LCD 71. However, the resolution of the touch panel 72 and the resolution of the LCD 71 need not be the same. An input onto the touch panel 72 is usually performed by using a touch pen. However, in addition to the touch pen, a finger of the user may be used for performing an input onto the touch panel 72. The housing 70 may have an opening for accommodating the touch pen used for performing an operation to the touch panel 72.

Further, the terminal apparatus 7 includes, as operation means, two analog sticks 75L and 75R, a cross button 76, and a plurality of buttons 77. Each of the analog sticks 75L and 75R is a device for designating a direction. The cross button 76 and the plurality of buttons 77 are each operation means for performing a predetermined input.

Figure 6:
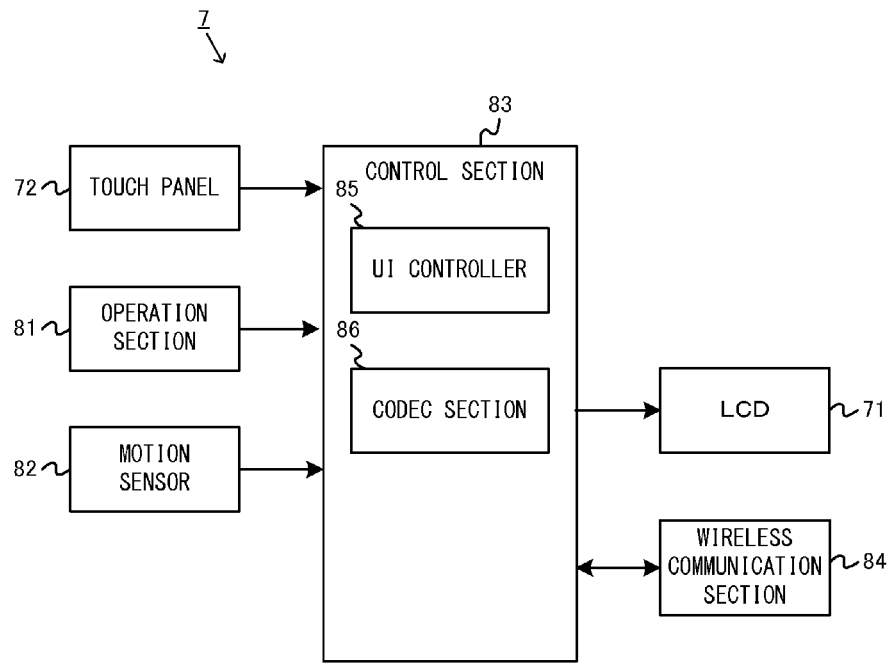
FIG. 6 is a block diagram showing a non-limiting example of an internal configuration of the terminal apparatus 7.

Next, the internal configuration of the terminal apparatus 7 will be described with reference to FIG. 6. FIG. 6 is a block diagram showing the internal configuration of the terminal apparatus 7. As shown in FIG. 6, in addition to the components shown in FIG. 5, the terminal apparatus 7 includes a control section 83, a wireless communication section 84, a motion sensor 82, and the like. These electronic components are mounted on an electronic circuit substrate and accommodated in the housing 70.

The motion sensor 82 is a sensor for detecting the attitude of the terminal apparatus 7. In the exemplary embodiment, an acceleration sensor, an angular velocity sensor, and a magnetic sensor, as examples of the motion sensor 82.

The control section 83 includes an UI controller 85, a codec section 86, and the like. The UI controller 85 controls input/output of data to/from the respective input/output sections. For example, a predetermined form of touch position data is input from the touch panel 72. The touch position data represents coordinates of a position at which an input is performed on an input surface of the touch panel 72. Generation of the touch position data is performed every predetermined time. Further, various control instructions on the touch panel 72 are output from the UI controller 85.

The analog sticks 75L and 75R included in the operation section 81 output, to the UI controller 85, stick data representing a direction in which the stick part operated by a finger of the user slides (or tilts), and the amount of the sliding (tilting). Further, the cross button 76 and the plurality of buttons 77 each output, to the UI controller 85, operation button data representing an input state of each button (whether or not the button is pressed).

The codec section 86 performs a compression process on data to be transmitted to the game apparatus 3, and a decompression process on data transmitted from the game apparatus 3. The control section 83 transmits the operation data obtained from the touch panel 72, the operation section 81, and the motion sensor 82, to the game apparatus 3 via the wireless communication section 84, as terminal operation data. As described above, the compressed image data and sound data are transmitted from the game apparatus 3 to the terminal apparatus 7. These data are transmitted to the control section 83 via the wireless communication section 84. The (codec section 86 of) control section 83 decompresses the received image data and sound data. The decompressed image data is output to the LCD 71, and an image is displayed on the LCD 71 (a terminal game image is displayed). Meanwhile, the decompressed sound data is output to a sound IC (not shown), and the sound IC causes loudspeakers (not shown) to output a sound (a terminal game sound is output).

Next, an outline of game processing performed in the game system 1 according to the exemplary embodiment will be described with reference to FIGS. 7 to 14.

In the game processing assumed in the exemplary embodiment, a competitive game played by a plurality of players is assumed. In the following description, a case where two players play a game will be described. In the exemplary embodiment, a competitive puzzle game having immediacy is assumed. Specifically, a so-called "falling puzzle game" is assumed, in which blocks falling from an upper portion of a screen are rotated and moved leftward and rightward, and blocks of the same color are aligned to make them disappear.

In this game, basically, each player operates the controller 5 while watching a game screen displayed on the television 2 to compete against another player. Further, depending on the progress of the game as described later, each player is caused to operate (exchange the controller 5 for) the terminal apparatus 7 during the competitive play. The term "during the competitive play" means that the main part of the competitive game is progressing. The term "during the competitive play" does not include, for example, a case where an operation to start the game from a menu screen is performed by using the terminal apparatus 7, and thereafter, the competitive game itself is played by using the controllers 5. In other words, the exemplary embodiment provides a new way to play the game by causing (by generating a situation where) each player who is just playing the "competitive game" using the controller 5 to operate the terminal apparatus 7 that is an operation device different from the controller 5 (specifically, an operation device having operation means that the controller 5 does not have).

More specifically, in the exemplary embodiment, when a predetermined condition is satisfied during the competitive play, each player can "hinder" the opponent. The content of this "hindrance" is to temporarily stop the game progress of the opponent (for example, to stop falling of blocks), and to make the operation of the opponent unacceptable. Hereinafter, this state is referred to as a "progress-locked mode". Then, the opponent who has entered the progress-locked mode needs to clear a mini game displayed on the terminal apparatus 7 by operating the terminal apparatus 7 in order to get out of this mode. That is, the exemplary embodiment provides a competitive game in which, by satisfying a predetermined condition during the competitive play, each player can generate "hindrance" that temporarily stops the game progress of the opponent, and the opponent needs to clear a mini game by operating the terminal apparatus 7 in order to cancel the "hindered" state.

From the above, in the exemplary embodiment, the players play the competitive game with the terminal apparatus 7 being placed near the players (preferably, within reach of the players), for example, being placed on a table within reach of the players.

Figure 7:
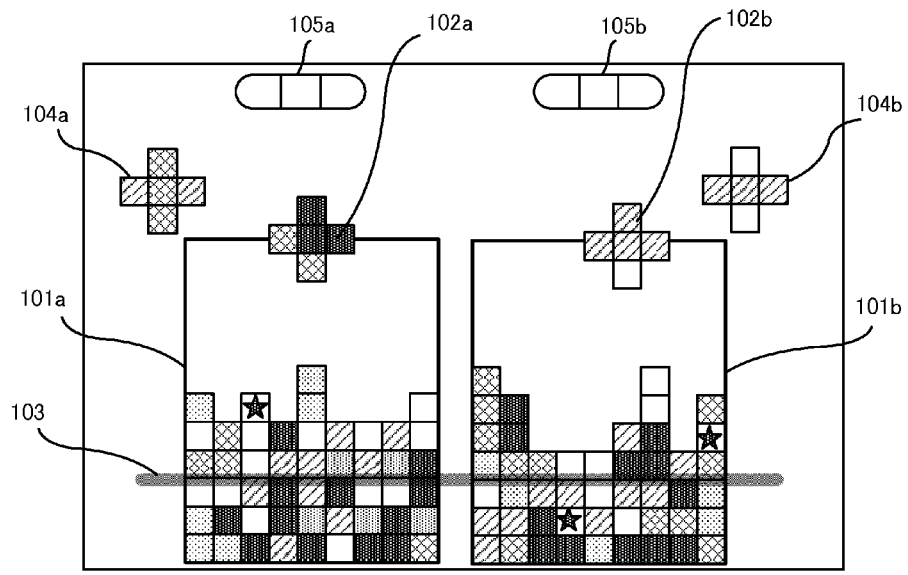
FIG. 7 is a diagram showing a non-limiting example of a game screen assumed in the exemplary embodiment.
Figure 8:
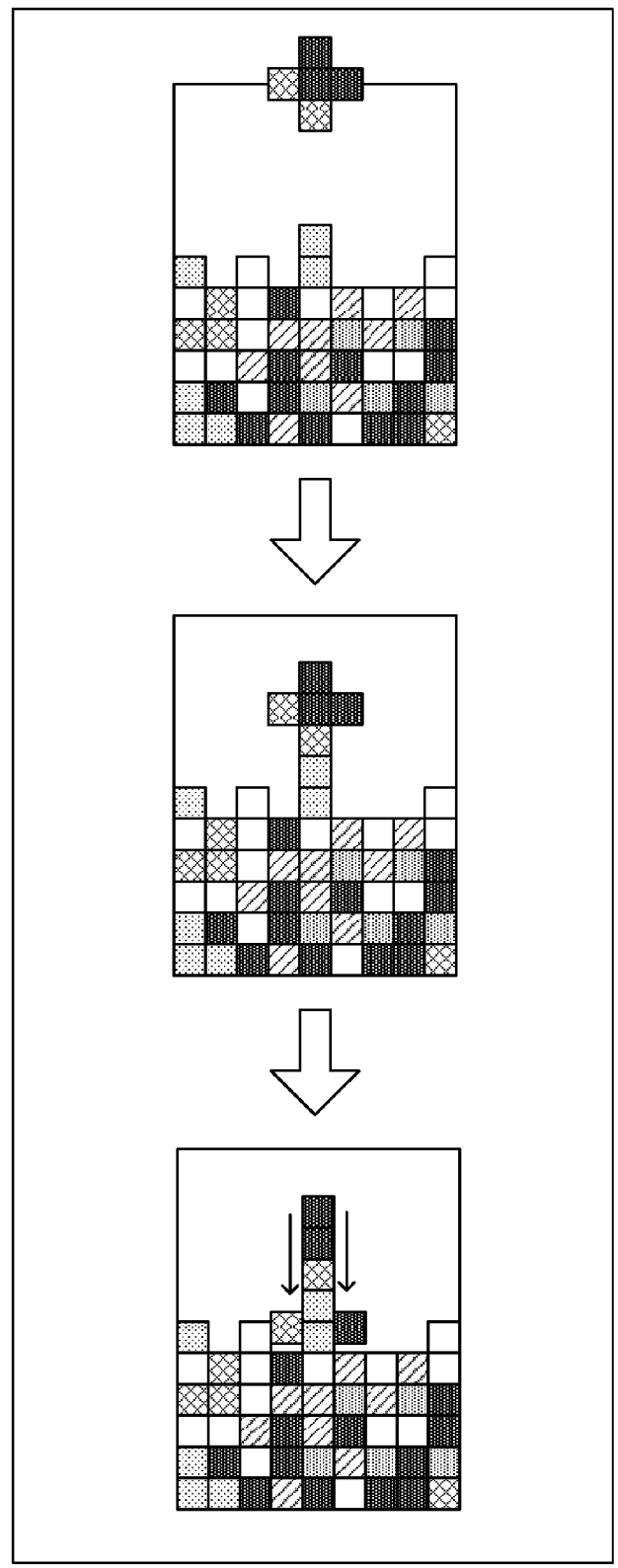
FIG. 8 is a diagram for explaining falling of blocks.
Figure 9:
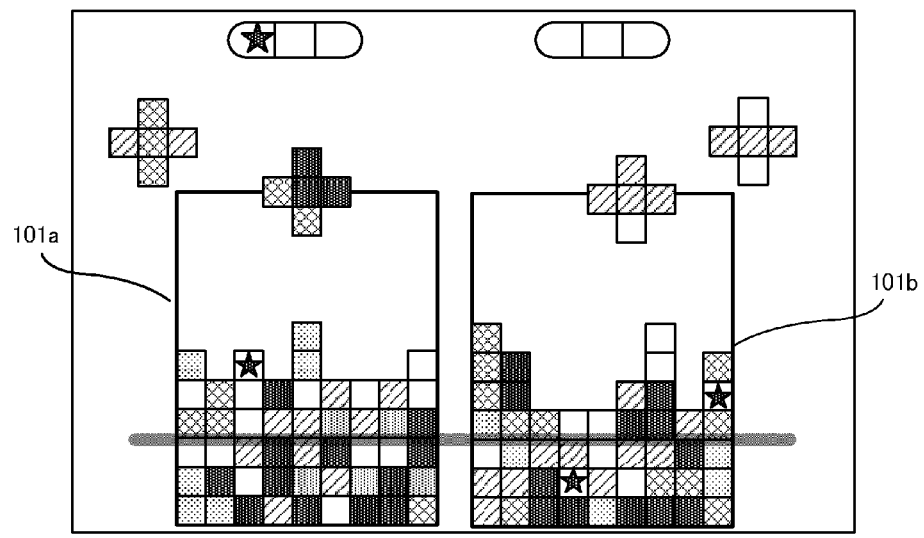
FIG. 9 is a diagram showing a non-limiting example of a game screen assumed in the exemplary embodiment.

FIG. 7 is an example of a screen during the competitive play of the puzzle game assumed in the exemplary embodiment. This screen is displayed on the television 2 (television game image). In FIG. 7, play fields 101*a* and 101*b* are displayed (hereinafter sometimes collectively referred to as "play field 101"). The play field 101*a* is displayed on the left side as seen from a player, and is assigned as a play region for a first player. The play field 101*b* is displayed on the right side as seen from the player, and is assigned as a play region for a second player. In each play field, some stacked blocks are displayed (hereinafter referred to as stack-up blocks). Further, falling blocks 102*a* and 102*b* are also displayed (hereinafter sometimes collectively referred to as "falling block 102"). The falling block 102*a* is assigned to the first player, and the falling block 102*b* is assigned to the second player. Each falling block is a block that falls from above the play field, and is composed of five blocks combined in a cross shape. Each falling block is moved leftward and rightward and rotated clockwise and counterclockwise in accordance with an operation of the player performed on the controller 5. At a position a little lower than the center of each play field, a clear line 103 is displayed across the both play fields. Further, next blocks 104*a* and 104*b* indicating falling blocks to fall next are also displayed corresponding to the respective players. Further, at an upper end of the screen, gauges 105*a* and 105*b* are displayed (hereinafter sometimes collectively referred to as "gauge 105"). The gauge 105 indicates the number of deleted blocks with star described later.

In this game, the blocks are color-coded, and there are four colors of blocks (four types of blocks). As a rule of this game, when four or more blocks of the same color are connected, the blocks disappear. The player successively deletes the blocks by operating the falling block 102, and clears the game when the stack-up blocks are lowered below the clear line 103. As for the blocks that have not been deleted when the falling block 102 was connected to the stack-up blocks, these blocks are separated and fall down (refer to FIG. 8).

There are some blocks each having a mark of a star, regardless of their colors. Hereinafter, such a block is referred to as a block with star. Every time a player deletes a block with star, an image of a star is displayed in the gauge 105 corresponding to the player (refer to FIG. 9). When the player has deleted three blocks with star (when the gauge 105 is filled with images of stars), the player can "hinder" the opponent as described above (the player can cause the "progress-locked mode").

Figure 10:
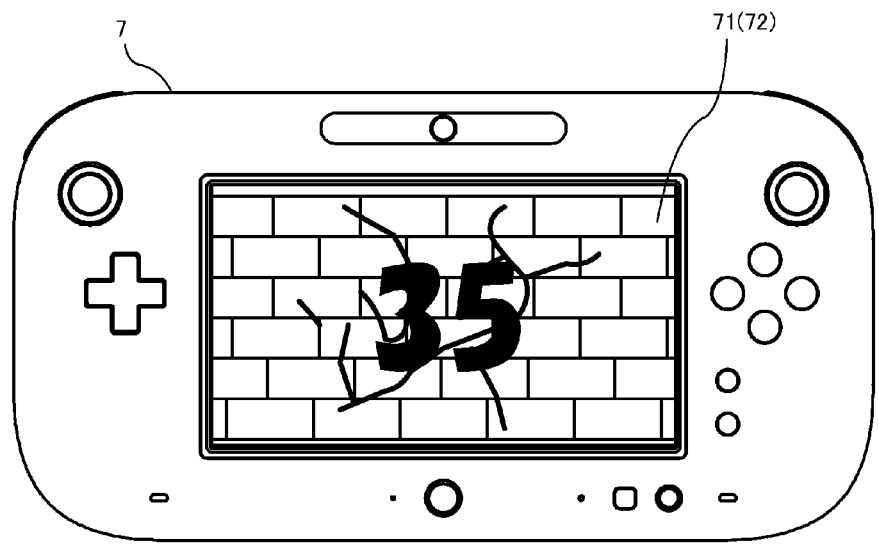
FIG. 10 is a diagram showing a non-limiting example of a game screen assumed in the exemplary embodiment.

FIG. 10 shows an example of a game screen (terminal game image) of a mini game displayed on the terminal apparatus 7 when the "progress-locked mode" is caused. There are prepared some mini games, and one of them is selected at random when the "progress-locked mode" is caused. FIG. 10 shows, as an example of a mini game, a game of breaking bricks. In this mini game, a player consecutively touches the LCD 71 (touch panel 72) to break bricks. For example, the player can break the bricks by touching the LCD 71 50 times. The image displayed on the LCD 71 shows the state where the bricks are getting broken every time the player touches the LCD 71. At or near the center of the LCD 71, a number indicating the number of times the player should touch the LCD 71 is displayed, and the number is counted down for every touch. When the player has broken the bricks, the mini game is cleared, and the "progress-locked mode" is canceled.

Figure 11:
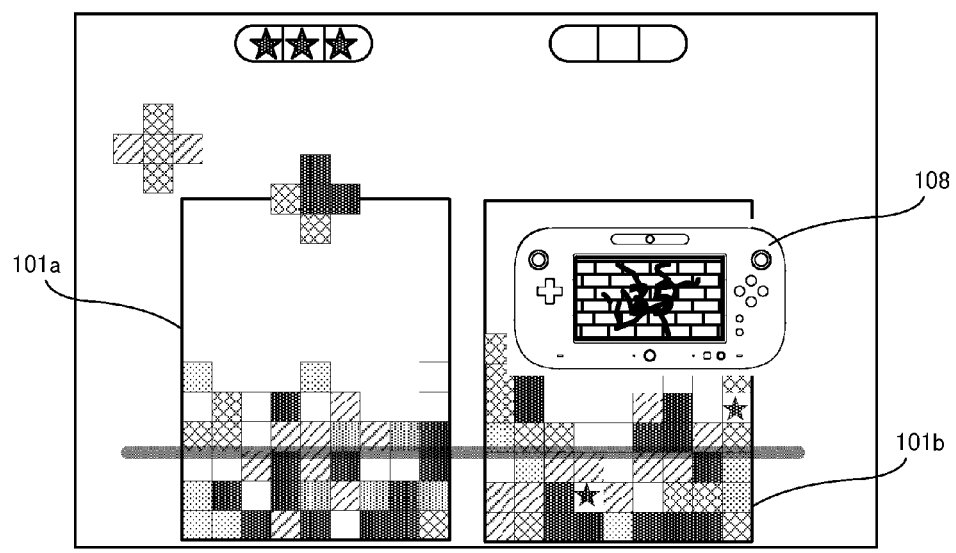
FIG. 11 is a diagram showing a non-limiting example of a game screen assumed in the exemplary embodiment.

FIG. 11 shows an example of the screen (television game image) of the television 2 when the "progress-locked mode" is caused. In FIG. 11, the first player has deleted three blocks with star, and thereby causes the "progress-locked mode" for the second player. In this case, the first player is in the operable state (in the state where he/she is able to continue the game based on the operation of the controller 5). On the other hand, the second player is in the state where his/her operation on the controller 5 is not accepted (the second player is in the state where he/she is playing the mini game using the terminal apparatus 7 in order to cancel the "progress-locked mode"). Furthermore, in the play field 101*b* of the second player, a locked image 108 representing the terminal apparatus 7 is superimposed. In the locked image 108, the same image as the terminal game image displayed on the LCD 71 of the terminal apparatus 7 is displayed (the terminal game image is mirror-displayed). Therefore, by looking at the locked image 108, the first player can know the progress of the mini game that the second player is playing.

Thereafter, when the second player has cleared the mini game, the "progress-locked mode" is canceled, the locked image 108 is deleted, and the operation of the second player is accepted. At this time, the display of the gauge 105 corresponding to the first player is initialized (the three images of stars are deleted). When the "progress-locked mode" is canceled, for example, a countdown to the cancellation (for example, a countdown of about three counts) may be displayed on the television 2 (play field 101*b*). Thereby, the second player can know the timing to return to the puzzle game, and therefore, can smoothly return to the puzzle game.

Figure 12:
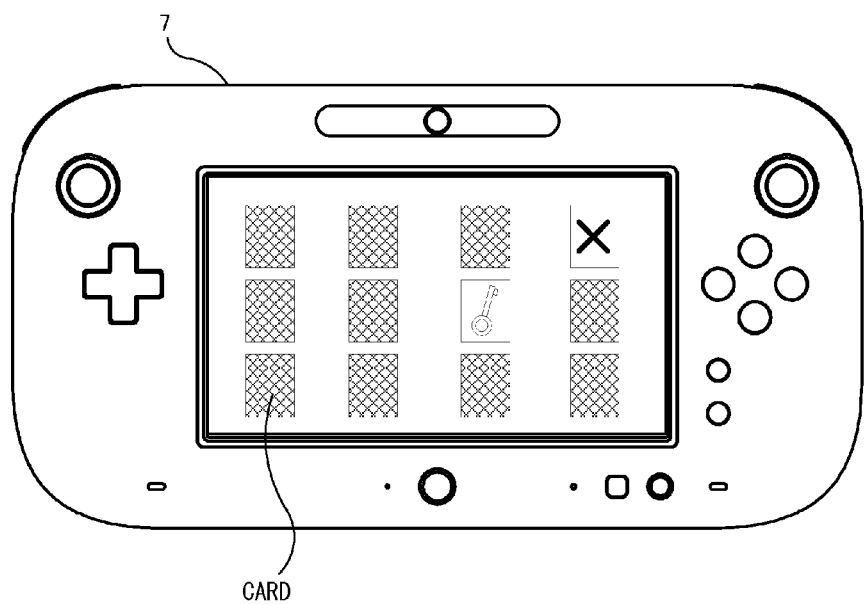
FIG. 12 is a diagram showing a non-limiting example of a game screen assumed in the exemplary embodiment.

Other examples of the mini game for canceling the "progress-locked mode" are as follows. First, FIG. 12 shows a card flip game. In this mini game, twelve cards are displayed face-down on the LCD 71. Then, a player touches each card to turn up the card until finding a card with a picture of a "key" (only one card of the twelve cards has such a picture).

Figure 13:
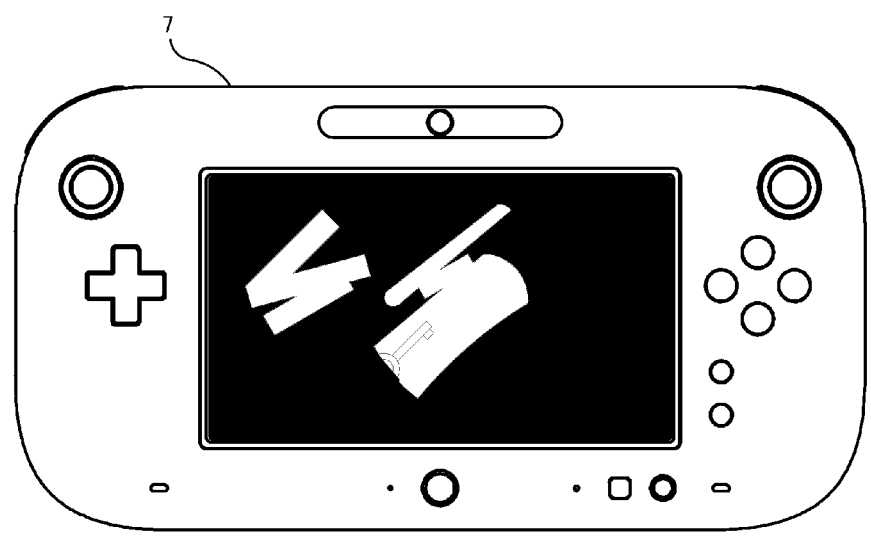
FIG. 13 is a diagram showing a non-limiting example of a game screen assumed in the exemplary embodiment.

Alternatively, there is a scratching game as shown in FIG. 13. In this mini game, a player performs an action like scratching the LCD 71 to find an image of a key hidden in the screen. In this case, the mini game is cleared when about 90% of the image of a key is displayed.

Still alternatively, there is a dicing game (not shown). In this mini game, an image of a key is provided on only one face of six faces of a dice, and the mini game is cleared when the face with this image comes at the top of the dice. In this case, the player can cast the dice by touching and sliding the LCD 71.

It is desirable that any mini game can be basically played with one hand, and particularly, can be cleared by only an operation performed on the touch panel 72. The reason is as follows. Since the "progress-locked mode" is caused during the competitive play of the game having immediacy, the player in the "progress-locked mode" is desired to clear the mini game as quick as possible. Therefore, the play style is assumed, in which the player performs a touch panel operation with only left hand while holding the controller 5 with right hand.

As described above, the exemplary embodiment provides a game in which a player is caused to exchange an operation device for another operation device during competitive play of a competitive game having immediacy. Thereby, it is possible to provide a new way to play a game with an increased sense of tension.

Figure 14:
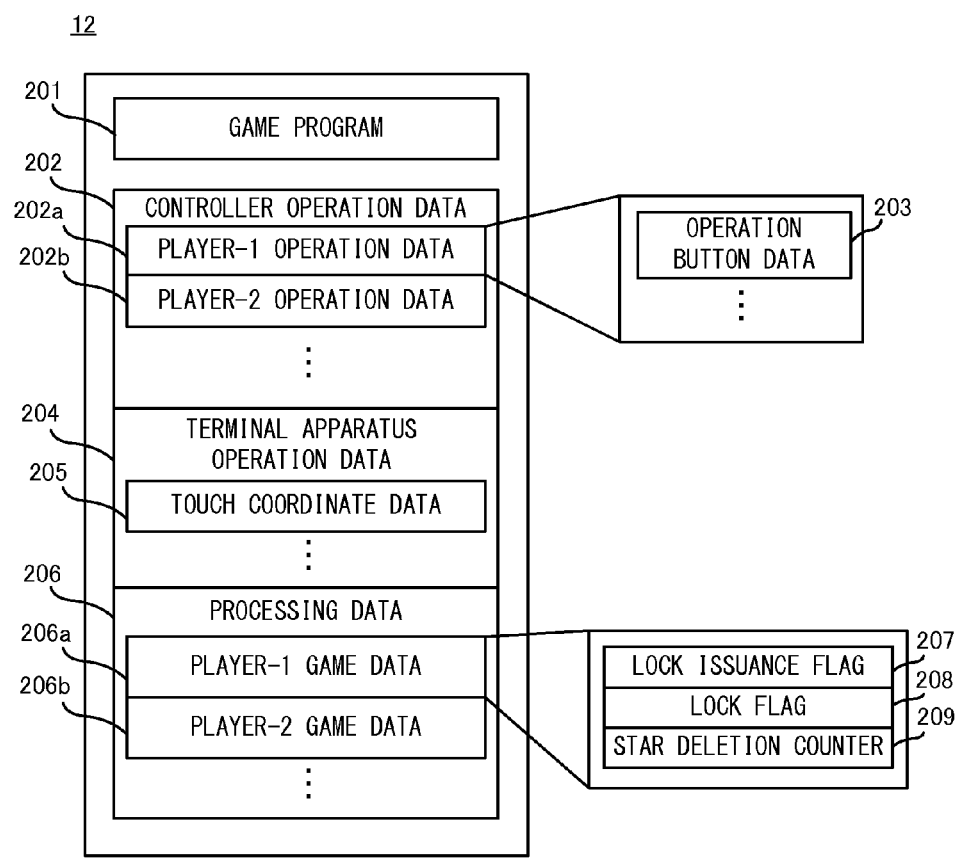
FIG. 14 is a diagram showing main data stored in a memory 12 of the game apparatus 3.

Next, the operation of the game apparatus 3 in the exemplary embodiment will be described in detail with reference to FIGS. 14 to 17. First, various data used in the game processing will be described. FIG. 14 is a diagram showing various data used in the game processing. FIG. 14 shows main data stored in the memory 12 of the game apparatus 3. As shown in FIG. 14, the memory 12 of the game apparatus 3 stores a game program 201, controller operation data 202, terminal apparatus operation data 204, and processing data 206. It is noted that the memory 12 stores, in addition to the data shown in FIG. 14, data desired for the game such as image data of various objects that appear in the game, audio data used in the game, and the like.

The game program 201 is stored in the memory 12 such that some or all of the game program 201 is loaded from the optical disc at an appropriate time after the game apparatus 3 has been powered on. It is noted that the game program 201 may be obtained from a flash memory or an external device of the game apparatus 3 which are not shown (via the Internet, for example), instead of from the optical disk. In addition, some of the game program 201 (for example, a program for calculating the attitudes of the controller 5 and/or the terminal apparatus 7) may be stored in advance in the game apparatus 3.

The controller operation data 202 is data representing an operation performed on the controller 5 by each user. In FIG. 14, the controller operation data 202 includes player-1 operation data 202a and player-2 operation data 202b (hereinafter, collectively referred to as "controller operation data 202"). The controller operation data 202 is transmitted from the controller 5 and obtained in the game apparatus 3. The controller operation data 202 includes operation button data 203, and the like. It is noted that the memory 12 may store a predetermined number of controller operation data in order from the latest (most recently obtained) operation data.

The operation button data 203 is data representing the input state of each of the operation buttons provided on the controller 5.

The terminal apparatus operation data 204 is data representing an operation of a player performed on the terminal apparatus 7. In FIG. 14, the terminal apparatus operation data 204 includes touch coordinate data 205 and the like. The touch coordinate data 205 is data representing coordinates of a position at which an input is performed on the input screen of the touch panel 72. In addition, the terminal apparatus operation data 204 may include data representing the content of an operation performed on any of the buttons of the terminal apparatus 7 (the cross button 76 and the plurality of buttons 77) and the analog stick 75, and data (acceleration data, angular velocity data, or the like) detected by the motion sensor 82.

Figure 15:
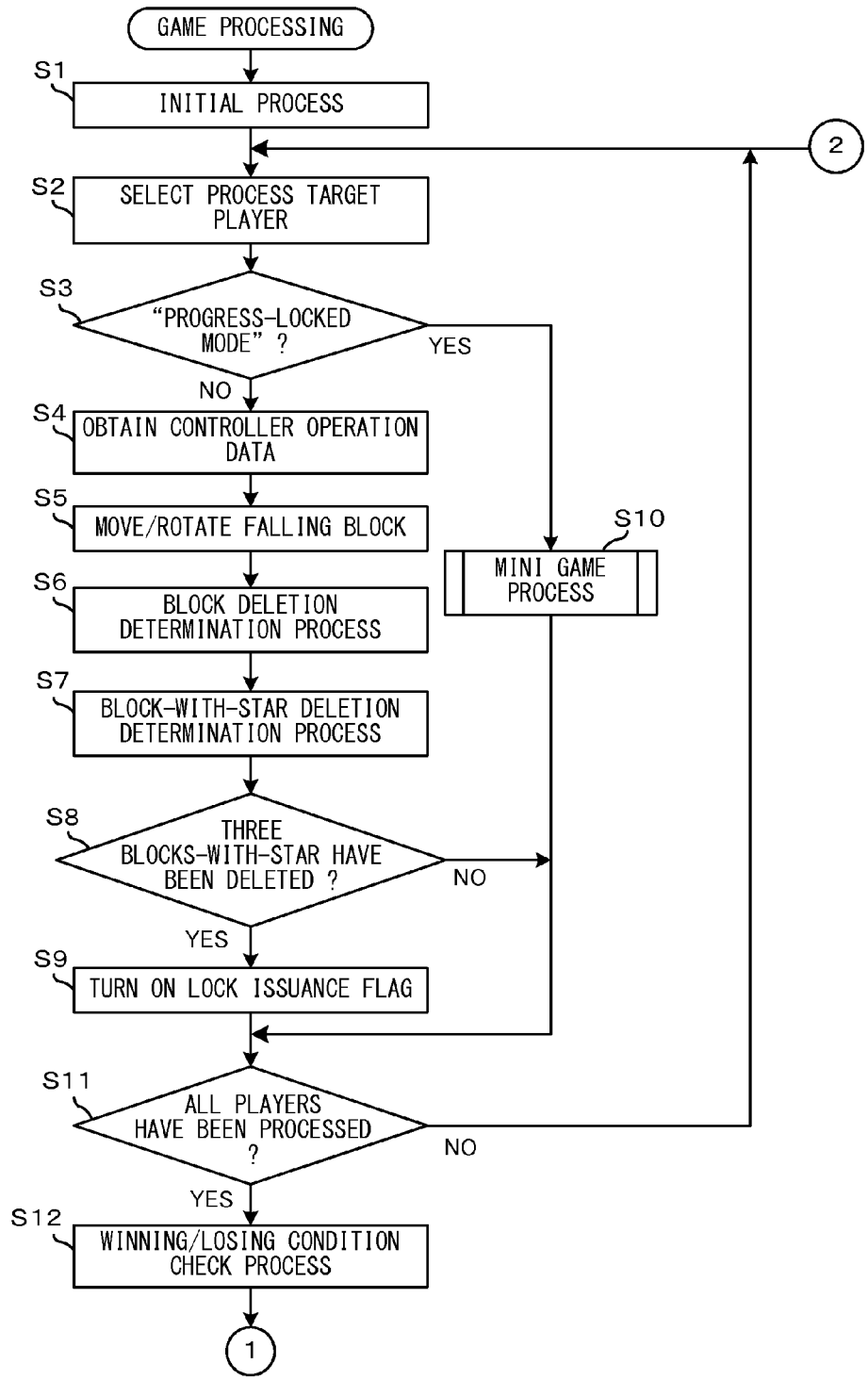
FIG. 15 is a flowchart showing in detail game processing of the exemplary embodiment.

The processing data 206 is data used in game processing described later (FIG. 15). The processing data 206 includes player-1 game data 206a, player-2 game data 206b, and the like. It is noted that the processing data 206 includes, in addition to the data shown in FIG. 14, various data used in the game processing, such as data representing various parameters set on the respective objects.

The player-1 game data 206a is game data used for the first player. The player-2 game data 206b is game data used for the second player. The game data of each player includes a lock issuance flag 207, a lock flag 208, and a star deletion counter 209, and the like.

The lock issuance flag 207 is a flag indicating whether or not a condition for causing the "progress-locked mode" is satisfied. In the above-mentioned example, when three blocks with star are deleted, this flag is turned on. The lock flag 208 is a flag indicating whether or not the corresponding player is currently in the "progress-locked mode". The star deletion counter 209 is data used for counting the number of deleted blocks with star.

Figure 16:
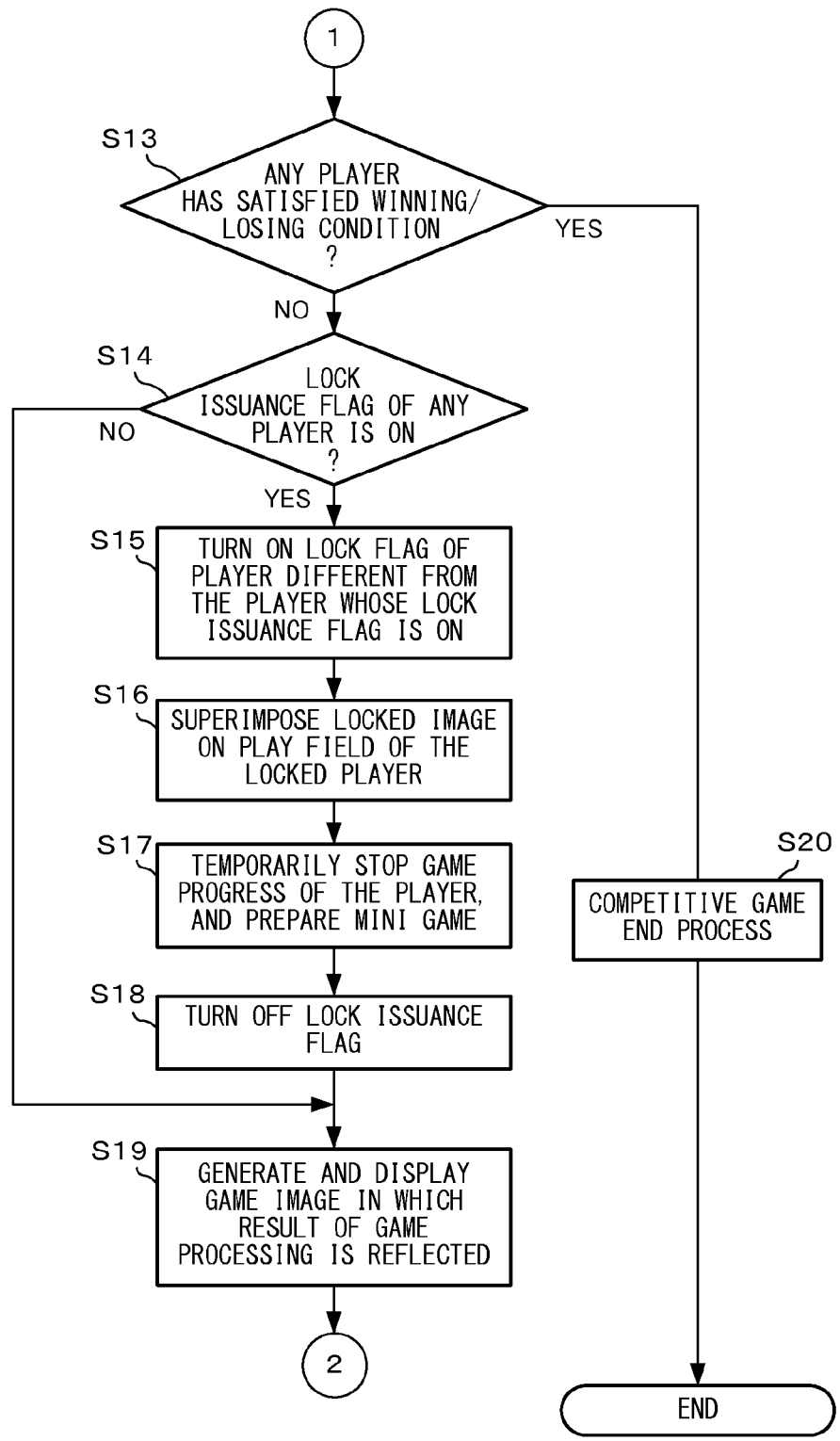
FIG. 16 is a flowchart showing in detail game processing of the exemplary embodiment.

Next, with reference to flowcharts of FIGS. 15 to 17, the flow of the game processing performed by the CPU 11 of the game apparatus 3 will be described. It is noted that the processes in the respective steps in the flowcharts shown in FIGS. 15 to 17 are merely examples, and therefore, the order of the steps may be changed as long as the same result is obtained. In addition, the values of the variables, and the thresholds used at determination steps are also merely examples, and other values may be used according to need. Further, in the exemplary embodiment, a description is given of the case where the CPU 11 performs the processes in the steps in the flowcharts. However, a processor other than the CPU 11 or a dedicated circuit may perform the processes.

When the game processing is started, the CPU 11 performs an initial process in step S1. The initial process may include: constructing a virtual game space; locating each object that appears in the game space, at an initial position; and setting the initial values of the various parameters used in the game processing. After the initial process has been completed, a processing loop including a series of processes in steps S2 through S19 is performed, for each player, every predetermined period (one frame period) and repeated.

In step S2, the CPU 11 selects players to be the targets of the following processes (hereinafter referred to as "process target players") from among unprocessed players. In the exemplary embodiment, the CPU 11 firstly selects the first player as a process target, and then selects the second player as a process target.

Next, in step S3, the CPU 11 determines whether or not each process target player is in the "progress-locked mode", with reference to the lock flag 208 of the process target player. When the flag is ON, the CPU 11 determines that the process target player is in the "progress-locked mode". Upon determining that the process target player is in the "progress-locked mode" (YES in step S3), the CPU 11 performs a mini game process in step S10. This process will be described later in detail.

On the other hand, when determining in step S3 that the process target player is not in the "progress-locked mode" (NO in step S3), the CPU 11 obtains the controller operation data 202 from the controller 5 of the process target player, in step S4. The controller 5 repeatedly transmits, to the game apparatus 3, the data outputted from the operation section 61 and the like, as the controller operation data 202. The game apparatus 3 sequentially receives the data from the controller 5, and sequentially stores the data as the controller operation data 202 in the memory 12. In step S2, the CPU 11 reads, from the memory 12, the latest controller operation data 202 relating to the process target player.

Next, in step S5, the CPU 11 performs a process relating to the falling block 102. That is, the CPU 11 performs a process of moving the falling block 102 downward (a process of causing the falling block 102 to fall) regardless of the player's operation, and a process of moving the falling block 102 leftward and rightward and rotating the falling block 102 based on the controller operation data 202.

Next, in step S6, the CPU 11 performs a block deletion determination process. Specifically, the CPU 11 determines whether or not four or more blocks of the same color are connected. Upon determining that four or more blocks of the same color are connected, the CPU 11 performs a process of deleting these blocks. As for the falling block 102 having not been deleted, the CPU 11 performs a process of separating the falling block 102 into individual component blocks, and appropriately moving the component blocks downward.

Next, in step S7, the CPU 11 performs a block-with-star deletion determination process. Specifically, the CPU 11 determines whether or not block(s) with star has been included in the blocks deleted in step S6. When block(s) with star has been included, the CPU 11 performs a process of placing image(s) of star(s) in the gauge 105, based on the number of the block(s) with star. In addition, the CPU 11 increases the count of the star deletion counter 209, based on the deletion of the block(s) with star.

Next, in step S8, the CPU 11 determines whether or not the number of the deleted blocks with star relating to the process target player has reached 3, with reference to the star deletion counter 209. That is, the CPU 11 determines whether or not the condition for causing the "progress-locked mode" has been satisfied. When the condition has not yet been satisfied (NO in step S8), the process goes to step S11 described later. On the other hand, when the condition has been satisfied (YES in step S8), the CPU 11 turns on the lock issuance flag 207 of the process target player, in step S9.

Next, in step S11, the CPU 11 determines whether or not the processes in steps S3 to S10 have been performed for all the players. When unprocessed player(s) still remains (NO in step S11), the CPU 11 returns to step S2 to repeat the processes.

On the other hand, the processes have already been performed for all the players (YES in step S11), the CPU 11 determines whether or not there is a player who has satisfied a winning/losing condition. Specifically, the CPU 11 determines whether or not any player can lower the stack-up blocks below the clear line 103 (winning condition), or whether or not the stack-up block(s) of any player has exceeded the upper end of the play field 101 (loosing condition; a player having even one such block is regarded as a loser). Next, in step S13, the CPU 11 determines whether or not any player has satisfied the winning/losing condition. Upon determining that no player has satisfied the wining/losing condition yet (NO in step S13), the CPU 11 determines whether or not the lock issuance flag 207 of any player is ON, in step S14. Based on the result of the determination, when the lock issuance flags 207 of all the players are OFF (NO in step S14), the process goes to step S19 described later. On the other hand, when the lock issuance flag 207 of any player is ON (YES in step S14), the CPU 11 turns on the lock flag 208 of the player (that is, the opponent) different from the player whose lock issuance flag 207 is ON, in step S15. For example, when the lock issuance flag 207 of the first player is ON, the lock flag 208 of the second player who is the opponent of the first player is turned on. As a result, the second player enters the "progress-locked mode".

Next, in step S16, the CPU 11 performs a process of generating a locked image 108 (refer to FIG. 11), and placing the locked image 108 so as to be superimposed on the play field 101 corresponding to the player whose lock flag 208 is turned on.

Next, in step S17, the CPU 11 performs a process of temporarily stopping the game progress of the player whose lock flag 208 is turned on. For example, the CPU 11 appropriately performs a process of temporarily stopping an animation effect used in the game progress, or a process of temporarily stopping a predetermined counter used in the game progress (used for measuring the elapsed time, or the like). Further, the CPU 11 executes a process of preparing a mini game. That is, the CPU 11 randomly selects a mini game to be executed this time from among a plurality of mini games, and appropriately performs an initialization process for initializing various parameters and the like used in the mini game.

Next, in step S18, the CPU 11 turns off the lock issuance flag 207. In association with this, the display content of the gauge 105 is initialized. That is, the three images of stars in the gauge 105 are deleted.

Next, in step S19, the CPU 11 generates a television game image in which the above-mentioned game processing is reflected. Further, if the mini game process in step S10 as described later is performed, the CPU 11 generates a terminal game image in which the content of the mini game process is reflected. At this time, the size of the terminal game image is appropriately adjusted so that the terminal game image is displayed in the locked image 108, and the television game image is generated so as to include the terminal game image. Then, the CPU 11 outputs the generated television game image to the television 2, and transmits the terminal game image to the terminal apparatus 7. Thereby, the television game image is displayed on the television 2, and the terminal game image is displayed on the LCD 71. Thereafter, the process returns to step S2, and the process steps are repeated.

Next, a process to be performed when any player has satisfied the winning/losing condition (YES in step S13) will be described. At this time, in step S20, the CPU 11 performs a process to end the competitive play. For example, the CPU 11 performs a process of stopping the progress of the game including the mini game, and appropriately displaying, on the screen, an effect representing winning/losing of each player. Then, the competitive game process is ended.

Next, the mini game process in step S10 will be described in detail. FIG. 17 is a flowchart showing the mini game process in detail. First, in step S31, the CPU 11 obtains the terminal apparatus operation data 204 from the terminal apparatus 7.

Next, in step S32, the CPU 11 performs the mini game process based on the obtained terminal apparatus operation data 204.

Next, in step S33, the CPU 11 determines whether or not the condition to clear the mini game has been satisfied. Upon determining that the condition has not been satisfied (NO in step S33), the CPU 11 ends the mini game process, and returns to the flowcharts of FIGS. 15 to 16. On the other hand, upon determining that the condition has been satisfied (YES in step S33), the CPU 11 turns off the lock flag 208 of the player in the "progress-locked mode", in step S34. Further, in step S35, the CPU 11 resumes the process relating to the game progress that has been temporarily stopped in step S17. Then, the mini game process is ended.

This is the end of the description of the game processing according to the exemplary embodiment.

As described above, in the exemplary embodiment, during a competitive game play, a player is caused to operate the terminal apparatus 7 that is an operation device different from the controller 5 that the player uses for the operation of the competitive game. Thereby, it is possible to provide a new way to play the game in which a player is caused to exchange a controller for another controller during competitive play. Further, in a game system using a plurality of controllers of the same type and one controller of a different type, the one controller can be equally and effectively shared between a plurality of players during competitive play.

Further, a player may make a strategy that he/she does not clear a mini game intentionally during the "progress-locked mode", and waits for self-destruction of the opponent (if the stack-up blocks reach the upper end of the play field, the player corresponding to the play field becomes a loser). Thus, the fun of the game can be increased.

In the exemplary embodiment, the game progress of the player in the "progress-locked mode" is temporarily stopped. In another embodiment, the game progress of the player in the "progress-locked mode" may be continued without being stopped although the operation of the controller 5 is not accepted. That is, in the above example, falling of the falling blocks 102 may be continued even during the "progress-locked mode".

Further, in another embodiment, when any player has satisfied the winning condition of the competitive game, winning determination is not performed immediately, but the player is caused to operate the terminal apparatus 7 at this timing, and when a predetermined condition has been satisfied, winning of this player may be decided. That is, in the above competitive puzzle game, when any player has lowered the stack-up blocks below the clear line 103 (when any player has satisfied the winning condition), the player is caused to play the above-mentioned mini game with the terminal apparatus 7, and when the player has cleared the mini game, winning of the player may be decided.

The processes described for the exemplary embodiment are also applicable to games other than the so-called falling puzzle game described above. For example, the processes are applicable to any competitive puzzle game with immediacy which is not the "falling" puzzle game. Further, the processes are also applicable not only to puzzle games but also to any multiplayer game with competitive factors.

Further, in the exemplary embodiment, a series of processes for performing competitive puzzle game processing is performed in a single apparatus. In another exemplary embodiment, however, the series of processes may be performed in an information processing system that includes a plurality of information processing apparatuses. For example, in an information processing system that includes the game apparatus 3 and a server side apparatus capable of communicating with the game apparatus 3 via a network, a part of the series of processes may be performed by the server side apparatus. Alternatively, in an information processing system that includes the game apparatus 3 and a server side apparatus capable of communicating with the game apparatus 3 via a network, a main process of the series of the processes may be performed by the server side apparatus, and a part of the series of the processes may be performed by the game apparatus 3. Still alternatively, in the information processing system, a server side system may include a plurality of information processing apparatuses, and a process to be performed in the server side system may be divided and performed by the plurality of information processing apparatuses.

What is claimed is:

1. A game system capable of performing a game process of a multiplayer game by using a plurality of operation devices, the game system comprising:
    a plurality of first-type operation devices;
    a second-type operation device different from the first-type operation devices;
    a main game processing section configured to perform the multiplayer game process that is progressed based on operations by the plurality of first-type operation device;
    a second operation device utilization processing section configured to
        cause the main game processing section not to accept any operation from a player's first-type operation device while the main game processing section is conducting the game in accordance with the operations by the plurality of first-type operation devices, when a first predetermined condition is satisfied in the game process through operations from other player's first-type operation devices, and
        perform a predetermined process that needs an operation with the second-type operation device; and
    a restoration processing section configured to cause the main game processing section to resume accepting the operation from the player's first-type operation device, when a second predetermined condition is satisfied in the predetermined process that needs the operation with the second type operation device.

2. The game system according to claim 1, wherein
the second operation device utilization processing section
    causes the main game processing section not to accept the operation from the first-type operation device operated by the any player, while the main game processing section is conducting the game, and
    performs a process of causing the player to perform a sub game that is progressed based on the operation with the second-type operation device, and
when a predetermined condition is satisfied in the process of the sub game, the restoration processing section performs a process of restoring the main game processing section to the state where it can accept the operation from the first-type operation device of the player who has been caused to play the sub game.

3. The game system according to claim 1, wherein
the second operation device utilization processing section
    performs the predetermined process that needs the operation with the second-type operation device, when a predetermined condition in the main game is satisfied during the progress of the game by the main game processing section.

4. The game system according to claim 1, wherein
the second-type operation device includes a display section, and an operation section that is not included in the first-type operation devices, and
the second operation device utilization processing section displays an image relating to the predetermined process on the display section of the second-type operation device, and performs the predetermined process based on an operation content of the operation section that is not included in the first-type operation devices.

5. The game system according to claim 4, wherein
the operation section of the second-type operation device, which is not included in the first-type operation devices, is a touch panel.

6. The game system according to claim 1, wherein
the main game processing section performs a competitive game process as the multiplayer game process, and
the second operation device utilization processing section performs the predetermined process that needs the operation with the second-type operation device, as a process of stopping the progress of the main game process of a player as an opponent.

7. The game system according to claim 6, wherein
the main game processing section performs a puzzle game in which players can align puzzle pieces as the competitive game.

8. The game system according to claim 6, wherein
the second operation device utilization processing section performs a sub game process that is progressed based on the operation with the second-type operation device, as the predetermined process that needs the operation with the second-type operation device, and
the restoration processing section performs a process of causing the main game processing section to resume accepting the operation from the player's first-type operation device, when a clear condition that has been defined in advance as a sub game clear condition is satisfied by the operation with the second-type operation device.

9. The game system according to claim 8, wherein
the sub game is a game that causes a player to perform a predetermined input operation continuously a predetermined number of times or more, and
when the predetermined input operation has been continuously performed the predetermined number of times or more, the restoration processing section determines that the clear condition is satisfied, and performs the process of causing the main game processing section to resume accepting the operation from the player's first-type operation device.

10. The game system according to claim 8, wherein
the sub game is a game in which a player is caused to find a predetermined object hidden in a screen,
the restoration processing section determines whether or not the predetermined object is found by the player in the sub game, and
upon determining that the predetermined object is found, the restoration processing section determines that the clear condition is satisfied, and performs the process of causing the main game processing section to resume accepting the operation from the player's first-type operation device.

11. A non-transitory computer-readable storage medium having stored thereon a game program performed by a computer of a game system capable of performing a game process of a multiplayer game by using a plurality of operation devices, the game program causing the computer to provide functionality comprising:
a main game processing configured to perform the multiplayer game process that is progressed based on operations by a plurality of first-type operation device;
a second operation device utilization processing configured to
cause the main game processing not to accept any operation from a player's first-type operation device while the main game processing is conducting the game in accordance with the operations by the plurality of first-type operation devices, when a first predetermined condition is satisfied in the game process through operations from other player's first-type operation devices, and
perform a predetermined process that needs an operation with a second-type operation device that is different from the first-type operation devices; and
a restoration processing configured to cause the main name processing to resume accepting the operation from the player's first-type operation device, when a second predetermined condition is satisfied in the predetermined process that needs the operation with the second type operation device.

12. A game processing method for controlling a game system capable of performing a game process of a multiplayer game by using a plurality of operation devices, the method comprising:
a main game processing step of performing the multiplayer game process that is progressed based on operations by a plurality of first-type operation device;
a second operation device utilization processing step of
causing the main game processing step not to accept any operation from a player's first-type operation device while the main game processing step is conducting the game in accordance with the operations by the plurality of first-type operation devices, when a first predetermined condition is satisfied in the game process through operations from other player's first-type operation device, and
performing a predetermined process that needs an operation with a second-type operation device that is different from the first-type operation devices; and
a restoration processing step of causing the main game processing step to resume accepting the operation from the player's first-type operation device, when a second predetermined condition is satisfied in the predetermined process that needs the operation with the second type operation device.

13. A game apparatus capable of performing a game process of a multiplayer game, based on operation data obtained from predetermined operation devices, the game apparatus comprising:
a main game processing section configured to perform the multiplayer game process that is progressed based on operation data obtained from a plurality of first-type operation device;
a second operation device utilization processing section configured to
cause the main game processing section not to accept any operation from a player's first-type operation device while the main game processing section is conducting the game in accordance with the operations by the plurality of first-type operation devices, when a first predetermined condition is satisfied in the game process through operations from other player's first-type operation devices, and perform a predetermined process that needs an operation with a second-type operation device that is different from the first-type operation devices; and a restoration processing section configured to cause the main game processing section to resume accepting the operation from the player's first-type operation device, when a second predetermined condition is satisfied in the predetermined process that needs the operation with the second type operation device.

14. A game system capable of performing a game process of a multiplayer game by using a plurality of operation devices, the game system comprising:

a plurality of first-type operation devices;

a second-type operation device different from the first-type operation devices;

a main game processing section configured to perform the multiplayer game process that is progressed based on operations by the plurality of first-type operation device;

a second operation device utilization processing section configured to cause any player to stop the operation with the first type-operation device while the main game processing section is conducting the game in accordance with the operations by the plurality of first-type operation devices, and perform a predetermined process that needs an operation with the second-type operation device; and a restoration processing section configured to cause the player who has stopped the operation to return to the operation with the first-type operation device, when a predetermined condition is satisfied in the predetermined process that needs the operation with the second type operation device, wherein the second operation device utilization processing section is further configured to cause the main game processing section not to accept the operation from the first-type operation device operated by the any player, while the main game processing section is conducting the game, and perform a process of causing the player to perform a sub game that is progressed based on the operation with the second-type operation device, and when a predetermined condition is satisfied in the process of the sub game, the restoration processing section performs a process of restoring the main game processing section to the state where it can accept the operation from the first-type operation device of the player who has been caused to play the sub game.

15. A game system capable of performing a game process of a multiplayer game by using a plurality of operation devices, the game system comprising:

a plurality of first-type operation devices;

a second-type operation device different from the first-type operation devices;

a main game processing section configured to perform the multiplayer game process that is progressed based on operations by the plurality of first-type operation device;

a second operation device utilization processing section configured to cause any player to stop the operation with the first type-operation device while the main game processing section is conducting the game in accordance with the operations by the plurality of first-type operation devices, and perform a predetermined process that needs an operation with the second-type operation device; and a restoration processing section configured to cause the player who has stopped the operation to return to the operation with the first-type operation device, when a predetermined condition is satisfied in the predetermined process that needs the operation with the second type operation device, wherein the second-type operation device includes a display section, and an operation section that is not included in the first-type operation devices, and the second operation device utilization processing section is further configured to display an image relating to the predetermined process on the display section of the second-type operation device, and perform the predetermined process based on an operation content of the operation section that is not included in the first-type operation devices.

16. The game system according to claim 15, wherein the operation section of the second-type operation device, which is not included in the first-type operation devices, is a touch panel.

17. A game system capable of performing a game process of a multiplayer game by using a plurality of operation devices, the game system comprising:

a plurality of first-type operation devices;

a second-type operation device different from the first-type operation devices;

a main game processing section configured to perform the multiplayer game process that is progressed based on operations by the plurality of first-type operation device;

a second operation device utilization processing section configured to cause any player to stop the operation with the first type-operation device while the main game processing section is conducting the game in accordance with the operations by the plurality of first-type operation devices, and perform a predetermined process that needs an operation with the second-type operation device; and a restoration processing section configured to cause the player who has stopped the operation to return to the operation with the first-type operation device, when a predetermined condition is satisfied in the predetermined process that needs the operation with the second type operation device, wherein the main game processing section is further configured to perform a competitive game process as the multiplayer game process, the second operation device utilization processing section is further configured to perform the predetermined process that needs the operation with the second-type operation device, as a process of stopping the progress of the main game process of a player as an opponent, the second operation device utilization processing section is further configured to perform a sub game process that is progressed based on the operation with the second-type operation device, as the predetermined process that needs the operation with the second-type operation device, the restoration processing section is further configured to perform a process of causing the player who has stopped the operation to return to the operation with the first-type operation device, when a clear condition that has been defined in advance as a sub game clear condition is satisfied by the operation with the second-type operation device, the sub game is a game that causes a player to perform a predetermined input operation continuously a predetermined number of times or more, and when the predetermined input operation has been continuously performed the predetermined number of times or more, the restoration processing section determines that the clear condition is satisfied, and performs the process of causing the player who has stopped the operation to return to the operation with the first-type operation device.

18. A game system capable of performing a game process of a multiplayer game by using a plurality of operation devices, the game system comprising:

a plurality of first-type operation devices;

a second-type operation device different from the first-type operation devices;

a main game processing section configured to perform the multiplayer game process that is progressed based on operations by the plurality of first-type operation device;

a second operation device utilization processing section configured to cause any player to stop the operation with the first type-operation device while the main game processing section is conducting the game in accordance with the operations by the plurality of first-type operation devices, and perform a predetermined process that needs an operation with the second-type operation device; and a restoration processing section configured to cause the player who has stopped the operation to return to the operation with the first-type operation device, when a predetermined condition is satisfied in the predetermined process that needs the operation with the second type operation device, wherein the main game processing section is further configured to perform a competitive game process as the multiplayer game process, the second operation device utilization processing section is further configured to perform the predetermined process that needs the operation with the second-type operation device, as a process of stopping the progress of the main game process of a player as an opponent, the second operation device utilization processing section is further configured to perform a sub game process that is progressed based on the operation with the second-type operation device, as the predetermined process that needs the operation with the second-type operation device, the restoration processing section is further configured to perform a process of causing the player who has stopped the operation to return to the operation with the first-type operation device, when a clear condition that has been defined in advance as a sub game clear condition is satisfied by the operation with the second-type operation device, the sub game is a game in which a player is caused to find a predetermined object hidden in a screen, the restoration processing section is further configured to determine whether or not the predetermined object is found by the player in the sub game, and upon determining that the predetermined object is found, the restoration processing section determines that the clear condition is satisfied, and performs the process of causing the player who has stopped the operation to return to the operation with the first-type operation device.

* * * * *